United States Patent Office 3,226,426
Patented Dec. 28, 1965

3,226,426
4-HYDROXY-2-BUTYNYL CARBAMATES
Thomas R. Hopkins, Overland Park, and Paul D. Strickler, Kansas City, Kans., assignors, by mesne assignments, to Gulf Oil Corporation, Pittsburgh, Pa., a corporation of Pennsylvania
No Drawing. Filed June 5, 1962, Ser. No. 200,053
1 Claim. (Cl. 260—471)

This application is a continuation-in-part of copending applications Serial No. 770,266 filed October 29, 1958, now abandoned, and Serial No. 842,587 filed September 28, 1959, now abandoned.

This invention relates to novel chemical compounds and methods of preparing the same. More particularly, this invention is concerned with a novel process of preparing 4-halo-2-butynyl carbamates and novel intermediates useful in such a process.

It is shown in the patent application of Thomas R. Hopkins and Joe W. Pullen, Serial No. 786,674 filed January 14, 1959, that 4-halo-2-butynyl carbamates of the formula

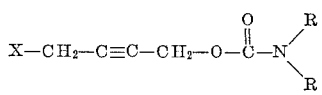

wherein X is a halogen, and particularly chlorine or bromine, R and $R_1$ are any combination of members of the group consisting of hydrogen, alkyl groups and particularly lower alkyl groups such as methyl, ethyl, propyl, isobutyl, hexyl and octyl, alkenyl groups and particularly lower alkenyl groups such as the allyl and 1-(2-butenyl) groups, aryl and nuclear substituted aryl groups such as the phenyl, naphthyl, biphenylyl, phenylazophenyl, halophenyl, lower alkoxyphenyl, nitrophenyl, hydroxyphenyl, carboxyphenyl, acyloxyphenyl and lower alkylphenyl groups and lower alkylenedioxy phenyl groups like the 3,4-methylenedioxyphenyl group, aralkyl groups such as the phenyl-lower alkyl groups like the benzyl, phenylethyl, o-methylbenzyl, 2-(3,4-methylenedioxyphenyl) ethyl, 3-(4-chlorophenyl)-propyl and 2-(3-methylphenyl) ethyl groups, cycloalkyl groups such as the cyclopentyl and cyclohexyl groups, alkynyl groups such as the propargyl group, hydroxyalkyl groups such as the hydroxyethyl group, phenyl-lower alkenyl groups such as the styryl group, cycloalkyl-lower alkyl groups like the cyclopentylpropyl and cyclohexylmethyl groups, and groups in which

represents heterocyclic groups formed by joining R and $R_1$ so that the nitrogen becomes part of the ring including the piperidino, pyrrolidino, isoindolino, 1,2,3,4-tetrahydroisoquinolino, 1,2,3,4-tetrahydroquinolino, tetrahydroisoindolino and indolino groups, have pesticidal activity. Such compounds have herbicidal plant growth regulant, nematocidal, fabric protectant, fungicidal, bactericidal or rust eradicant activity although obviously not every compound has each of these activities. As shown in patent application Serial No. 723,133, filed March 24, 1958, now U.S. Patent No. 2,906,614, by these same applicants, the 4-halo-2-butynyl N-(3-halophenyl)carbamates are selective herbicides for controlling wild oats which is a serious problem in wheat growing areas of the world.

While both of said patent applications Serial Nos. 723,133 filed March 24, 1958, now U.S. Patent No. 2,906,614, and 786,674 filed January 14, 1959, disclose processes of preparing such compounds, an alternative and better process is illustrated in the patent application of Thomas R. Hopkins and Paul D. Strickler, Serial No. 770,266, filed October 29, 1958, now abandoned. This process comprises reacting a 2-butyne-1,4-diol with an isocyanate to form a 4-hydroxy-2-butynyl carbamate which is then halogenated to form the 4-halo-2-butynyl carbamate. This process can be represented as follows:

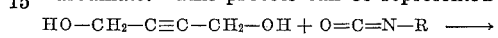
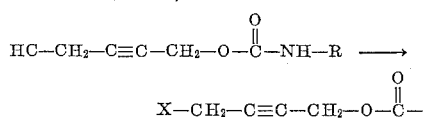

wherein X and R have the significance assigned above except that R is not hydrogen here. This is a good process except that it involves the preparation and isolation of the isocyanate reactants because many of these are not commercially available. In addition, only the N-monosubstituted carbamates are formed in this way.

According to the present invention there is provided a novel process of producing 4-halo-2-butynyl carbamates which comprises reacting 2-butyn-1,4-diol with phosgene to produce 4-hydroxy-2-butynyl chlorocarbonate which is then reacted with a primary or secondary amine to form a 4-hydroxy-2-butynyl carbamate which upon halogenation gives a 4-halo-2-butynyl carbamate. This process can be represented as follows:

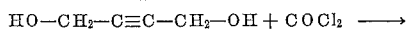
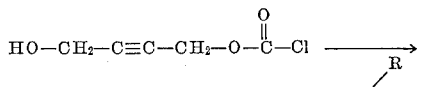
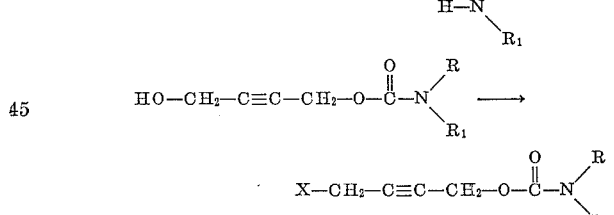

wherein R, $R_1$ and X have the significance assigned above.

The first step of this process involving the reaction of 2-butyn-1,4-diol with phosgene is readily effected by bringing the reactants together in an inert liquid reaction medium, such as dioxane. The reactants are advisably brought together at a temperature below 45° C. An excess of the diol is recommended to minimize the formation of undesirable side products. Thus, from about 2 to 5 moles of diol per mole of phosgene are employed for optimum results. The reaction is completed in a matter of about 0.5 to 2 hours.

The reaction mixture containing the resulting 4-hydroxy-2-butynyl chlorocarbonate can be processed, if desired, to isolate and purify the product. However, it is not necessary in practicing the invention to isolate this intermediate. This accordingly is not done since the compound has lachrymater properties and is not extremely stable. The second step can be readily effected by combining the reaction mixture containing the 4-hydroxy-2-butynyl chlorocarbonate with an appropriate primary or secondary amine. An excess of the amine or some other appropriate base, such as pyridine, is advisably used to neutralize the by-product hydrogen chloride formed in the reaction. The reaction is generally readily effected at room temperature although higher or lower temperatures are sometimes found more satisfactory.

Some of the primary and secondary amines which can be employed in the process are ammonia, methyl amine, aniline, 3-chloroaniline, 4-bromoaniline, 4-chloroaniline, 2-bromoaniline, 2-chloroaniline, phenylethylamine, cychlohexylamine, allylamine, 1-naphthylamine, N-methyl-4-amino-piperidine, pyrrolidine, 4-nitroaniline, 3-nitroaniline, 2,5-dichloroaniline, 4-aminobiphenyl, beta-naphthylamine, p-toluidine, N-methylaniline, 2-chloro-4-nitroaniline, diphenylamine, 4-aminophenol, 4-nitro-2-aminotoluene, 2,4-dimethylaniline,, 2,5-dimethoxyaniline, dodecylamine, benzylamine, n-hexylamine and tertiary-butylamine.

Following the reaction the mixture can be diluted with water to precipitate some of the desired 4-hydroxy-2-butynyl carbamate which can be isolated by filtration. The crude crystalline 4-hydroxy-2-butynyl carbamates can be recrystallized from solvents such as water, benzene, dioxane and methanol to obtain the pure product. Products which are oils are recovered by distillation. Thus, the reaction mixture can be treated under reduced pressure to strip off the solvent, the residue extracted with ether or benzene, and the solution distilled under reduced pressure to isolate the liquid carbamate.

Some of the compounds which can be produced in this way are 4-hydroxy-2-butynyl N-(4-nitrophenyl)carbamate,
4-hydroxy-2-butynyl N-(3-chlorophenyl)carbamate,
4-hydroxy-2-butynyl N-(3-bromophenyl)carbamate,
4-hydroxy-2-butynyl N-(2,5-dichlorophenyl)carbamate,
4-hydroxy-2-butynyl N-(4-phenylphenyl)carbamate,
4-hydroxy-2-butynyl N-(beta-naphthyl)carbamate,
4-hydroxy-2-butynyl N-(2-methoxyphenyl)carbamate,
4-hydroxy-2-butynyl N-(4-methylphenyl)carbamate,
4-hydroxy-2-butynyl N-methyl-N-phenyl carbamate,
4-hydroxy-2-butynyl N-(2-chloro-4-nitrophenyl) carbamate,
4-hydroxy-2-butynyl N,N-diphenyl carbamate,
4-hydroxy-2-butynyl N-(4-hydroxyphenyl)carbamate,
4-hydroxy-2-butynyl N-(4-carboxyphenyl)carbamate,
4-hydroxy-2-butynyl N-(2-nitrophenyl)carbamate,
4-hydroxy-2-butynyl N-(4-cyanophenyl)carbamate,
4-hydroxy-2-butynyl N-(2-methyl-5-nitrophenyl) carbamate,
4-hydroxy-2-butynyl N-(2-methyl-3-chlorophenyl) carbamate,
4-hydroxy-2-butynyl N-(2,4-dimethylphenyl)carbamate,
4-hydroxy-2-butynyl N-(2,5-dimethoxyphenyl) carbamate,
4-hydroxy-2-butynyl N-benzyl carbamate,
4-hydroxy-2-butynyl N-cyclohexyl carbamate,
4-hydroxy-2-butynyl N-dodecyl carbamate,
4-hydroxy-2-butynyl N-hexyl carbamate,
4-hydroxy-2-butynyl piperidino carbamate and
4-hydroxy-2-butynyl N-$t$-butyl carbamate.

The 4-hydroxy-2-butynyl carbamates are readily converted to the 4-halo-2-butynyl carbamates by reaction with a suitable halogenating agent. Among the halogenating agents which can be employed are thionyl halides such as thionyl chloride, phosphorus trihalides such as phosphorus tribromide, and phosphorus pentahalides such as phosphorus pentachloride.

The halogenation is advisably effected under liquid reaction conditions. This can be achieved by use of an excess of halogenating agents which are liquids at the reaction temperatures or, and preferably, by the use of inert organic solvents such as xylene, benzene, toluene, chloroform and carbon tetrachloride. It is desirable to have present during the reaction an organic base such as pyridine to combine with the hydrogen halide as it is formed in the reaction.

Reaction temperatures will vary considerably with the solvents used. However, room temperature is usually satisfactory to effect the reaction with most of the halogenating agents. Substantially complete halogenation is achieved in about 1 to 3 hours although the time will obviously vary with the halogenating agent and other conditions used. The desired product can be separated from the reaction mixture by conventional methods.

By the described method, 4-halo-2-butynyl carbamates can be prepared from the 4-hydroxy-2-butynyl carbamates such as those described and named above.

The 4-hydroxy-2-butynyl carbamates also have nematocidal activity. To detect nematocidal activity of the compounds in the absence of the complicating soil factor the following test was performed:

To prepare a chemical suspension, 0.2 g. of the compound was weighed into a mortar, 2 drops of Emulphor EL (a wetting agent) and 2 drops of a 5% aqueous methyl cellulose solution were added, an emulsion made and the volume brought up to 134 ml. with water. The suspension was diluted to give a final dilution containing 500 p.p.m. (parts per million) of the compound. To the dilution in a test tube was added 2 drops of a suspension of Panagrellus nematode larvae containing at least 150 larvae, and the test tube stoppered. After 7 days, the contents of the test tube were observed. When all of the nematodes are dead, the compound is recorded as effective. The concentration at which a complete kill is obtained was recorded.

It was observed using this test that 4-hydroxy-2-butynyl-N-(3-chlorophenyl)carbamate gives a 100% kill of nematodes after 7 days at a cencentration of 500 p.p.m. It was observed that the 3-bromo analogue gives the same control of nematodes.

4-hydroxy-2-butynyl-N-(3-chlorophenyl) carbamate functions as a selective crab grass killer when applied to bluegrass lawns at about five pounds per acre on sandy soil.

The following examples are presented to illustrate the invention.

*Example 1*

A solution of 2-butyne-1,4-diol (215.3 grams, 2.5 moles) in dry acetone (600 ml.) was stirred and cooled to 20° C. Phosgene (49.5 grams; 0.5 mole) was introduced below the surface of the solution over a one-hour time interval during which time the temperature was maintained between 20–25° C. by occasional cooling with an ice-water bath. The mixture was stirred for one hour at ambient temperature after addition of the phosgene had been completed. To the mixture containing 4-hydroxy-2-butynyl chlorocarbonate was added a mixture of m-chloroaniline (63.75 grams; 0.5 mole) and pyridine (39.6 grams; 0.5 mole) dropwise at 20–25° C. over a period of about one hour. The mixture was stirred for two hours at ambient temperature and then poured into 2.5 liters of cold water. The aqueous mixture was stirred, chilled to about 0° C., and the crude product, removed by filtration, washed with an additional 800 ml. of ice-water and finally vacuum dried. A total of 84.4 grams of crude product, melting point 81–85° C., was obtained which was found to be 90% 4-hydroxy-2-butynyl N-(3-chlorophenyl)carbamate by infrared analysis, representing a 63.3% conversion based on the amount of phosgene charged.

Example 2

A solution of 43.0 grams (0.5 mole) of 2-butyne-1,4-diol and dry p-dioxane (125 ml.) was stirred and cooled to 15° C. Phosgene (39.6 gms.; 0.4 mole) was introduced below the surface of the solution over a one hour time interval during which time the temperature was maintained between 15–20° C., by occasional cooling with an ice-water bath. The mixture was stirred for one hour at 15–20° C., after addition of the phosgene had been completed. A mixture of m-chloroaniline (51 grams; 0.4 mole) and pyridine (63.3 grams; 0.8 mole) was added dropwise at 15–20° C. (30 minutes) to the solution containing the 4-hydroxy-2-butynyl chlorocarbonate and the mixture stirred for one hour at ambient temperature after addition of the aniline had been completed. The volatiles and most of the dioxane were removed by distillation under reduced pressure at less than 40° C. The residual slurry was poured into 1500 ml. of ice-water with stirring, forming a crystalline precipitate. The crystalline product was removed by filtration, washed with 250 ml. of ice-water; air, and then vacuum dried. A total of 83.8 grams of crude product, melting point 65–78° C., was obtained which was found to be 73% 4-hydroxy-2-butynyl N-(3-chlorophenyl) carbamate by infrared analysis, representing a conversion of 63.4% based on the amount of phosgene charged.

Example 3

The procedure of Example 2 was repeated except that 19.8 grams (0.2 mole) of phosgene, 25.5 grams (0.2 mole) of m-chloroaniline and 31.6 grams (0.4 mole) of pyridine were used. This represents a diol to phosgene mole ratio of 2.5 to 1. A total of 41.2 grams of crude product, melting point 70–80° C., was obtained which was found to be 83% 4-hydroxy-2-butynyl N-(3-chlorophenyl)carbamate by infrared analysis, representing a conversion of 71% based on the amount of phosgene charged.

Example 4

The procedure employed was the same as in Example 2 except that 86.1 grams (1.0 mole) of 2-butyne-1,4-diol, 19.8 grams (0.2 mole) of phosgene, 250 ml. of dioxane, 25.5 grams (0.2 mole) of m-chloroaniline and 31.6 grams (0.4 mole) of pyridine were used. The diol to phosgene mole ratio was 5 to 1. A total of 33.1 grams of crude product, melting at 77–82° C., was obtained which analyzed 89% 4-hydroxy-2-butynyl N-(3-chlorophenyl)carbamate by infrared analysis, corresponding to a 61.5% conversion based on the amount of phosgene charged.

Example 5

The procedure of Example 2 was followed except that 86.1 grams (1.0 mole) of 2-butyne-1,4-diol, 9.9 grams (0.1 mole) of phosgene, 250 ml. of dioxane, 12.7 grams (0.1 mole) of m-chloroaniline and 15.8 grams (0.2 mole) of pyridine were used. The mole ratio of diol to phosgene was 10 to 1. A total of 17.2 grams of crude product melting at 80–83.5° C. was obtained and found to be 92% 4-hydroxy-2-butynyl N-(3 - chlorophenyl)carbamate by infrared analysis, corresponding to a 66% conversion based on the amount of phosgene charged.

Example 6

The procedure of Example 2 was followed except that 86.1 grams (1.0 mole) of 2-butyne-1,4-diol, 5.0 grams (0.05 mole) of phosgene, 250 ml. of dry dioxane, 6.4 grams (0.05 mole) of m-chloroaniline and 7.9 grams (0.1 mole) of pyridine were used. This corresponds to a diol to phosgene mole ratio of 20 to 1. The crude product weighed 5.8 grams and melted at 83–85° C., and was found to contain 92% 4-hydroxy-2-butynyl N-(3-chlorophenyl)carbamate by infrared analysis.

Example 7

A solution of 86.1 grams (1.0 mole) of 2-butyne-1,4-diol in 250 ml. of dry dioxane was stirred and warmed to 40° C. Phosgene (19.8 grams; 0.2 mole) was introduced below the surface of the solution over a one hour time interval during which time the temperature was maintained at 39–41° C. The mixture was stirred for one hour at about 40° C. after the addition of phosgene had been completed. A mixture of m-chloroaniline (25.5 grams; 0.2 mole) and 31.6 grams (0.4 mole) of pyridine was added dropwise at about 40° C. (30 minutes), and the mixture stirred for one hour at ambient temperature. The volatiles and most of the dioxane were removed by distillation under reduced pressure keeping the solution at a temperature of less than 40° C. The residue was poured into 1500 ml. of ice-water with stirring, forming a crystalline precipitate. The crude crystalline product was removed by filtration, washed with 250 ml. of ice-water, air-dried and finally vacuum dried. A total of 32.1 grams of crude product, melting at 74–79° C., was obtained which was found to be 88% 4-hydroxy-2-butynyl N-(3-chlorophenyl)carbamate by infrared analysis corresponding to a 59% conversion based on the amount of phosgene charged.

Example 8

A solution of 2-butyne-1,4-diol (86.1 grams; 1.0 mole) in 250 ml. of dry dioxane was stirred and phosgene (49.5 grams; 0.25 mole) was introduced below the surface of the solution over a one hour time interval during which time the temperature was maintained between 25–30° C., by occasional cooling with an ice-water bath. Stirring was continued at ambient temperature for 30 minutes after the addition of the phosgene was completed. A mixture of 31.9 grams (0.25 mole) of m-chloroaniline and 39.6 grams (0.5 mole) of pyridine was added dropwise at 25–30° C., over a period of 30 minutes. The stirring was continued for one hour at ambient temperature. Most of the volatiles and dioxane were removed by distillation under reduced pressure keeping the temperature of the solution at less than 40° C. The residue was diluted with 1 liter of water and chilled to about 0° C., forming a crystalline precipitate. The crude product was removed by filtration and the resultant tan crystals vacuum dried to give 44.4 grams melting at 75–80° C. The crude product analyzed 84% 4-hydroxy-2-butynyl N-(3-chlorophenyl)carbamate by infrared analysis, corresponding to 62% conversion based on the amount of phosgene charged.

Example 9

A solution of 86.1 grams (1.0 mole) of 2-butyne-1,4-diol in 250 ml. of dry dioxane was stirred and cooled at 15° C. Phosgene (39.6 grams; 0.4 mole) was introduced below the surface of the solution at 15–20° C., over a period of one hour and the stirring continued for one hour at 15–20° C. after the addition of the phosgene was completed. A mixture of m-chloroaniline (31.9 grams; 0.25 mole) and pyridine (39.6 grams; 0.5 mole) was added dropwise at 15–20° C., over a period of about 30 minutes. The stirring was continued for one hour after the addition was completed. The volatiles and most of the dioxone were removed by distillation at less than 40° C., under reduced pressure. The residue was then diluted with 1 liter of cold water and chilled to about 0° C., forming a crystalline precipitate. The crystalline product was removed by filtration and air-dried to give 58.4 grams of crude product melting at 71–77° C. Infrared analysis showed that the crude material was 86% 4-hydroxy-2-butynyl N-(3-chlorophenyl)carbamate corresponding to an 80.3% conversion based on the amount of 3-chloroaniline charged or a 52.3% conversion based on the amount of phosgene charged. In this example the diol/chloroaniline mole ratio was 4/1 and the diol/phosgene mole ratio was 2.5/1.

Example 10

In this example excess chloroaniline was used to neutralize the by-product hydrogen chloride as it was formed.

A solution of 86.1 grams (1.0 mole) of 2-butyne-1,4-diol and 250 ml. of dry dioxane was stirred and cooled to 15° C. Phosgene (19.8 grams; 0.2 mole) was introduced below the surface of the solution at 15–20° C. for a period of about one hour. The mixture was stirred at 15–20° C. for one hour after the phosgene addition was completed. m-Chloroaniline (76.5 grams; 0.6 mole) was added dropwise over a period of 30 minutes at about 15–20° C. The crystalline m-chloroaniline hydrochloride precipitated during the addition period. The mixture was stirred for an additional hour at ambient temperature after the chloroaniline addition was completed. Hydrogen chloride gas was bubbled into the stirred slurry for a short time to make sure that all aniline present was converted to its hydrochloride. The mixture was filtered to remove the m-chloroaniline hydrochloride, which was washed with 100 ml. of diethyl ether. The ether wash was added to the dioxane filtrate. After drying in a vacuum desiccator, the m-chloroaniline hydrochloride weighed 69.7 grams. The dioxane-ether filtrate was distilled under reduced pressure at a temperature of less than 40° C., to remove most of the ether and dioxane. The residue was added with stirring to 1500 ml. of ice-water. The crystalline precipitate was removed by filtration, washed with 250 ml. of ice-water, air dried over night and finally dried in a vacuum oven. A total of 33.2 g. of crude product was obtained which analyzed 90% 4-hydroxy-2-butynyl N-(3-chlorophenyl)carbamate by infrared analysis.

Example 11

A solution of 9.5 g. (0.08 mole) of thionyl chloride in 25 ml. of chloroform was added, with stirring, to a solution of 15.0 g. (0.065 mole) of crude 4-hydroxy-2-buytnyl N-(3-chlorophenyl)carbamate and 10 g. of pyridine in 100 ml. of chloroform over a 1.5 hour period at ambient temperature. The solution was stirred for an additional 3 hours, washed with water and aqueous sodium bicarbonate solution and dried over anhydrous calcium sulfate. The dried chloroform solution was concentrated to about half volume, diluted with n-hexane and chilled. The crystalline precipitate was removed by filtration to give 14.0 g. (83.6%) of crude 4-chloro-2-butynyl N-(3-chlorophenyl)carbamate, M.P. 70–73° C. Treatment of the crude product in a benzene solution with decolorizing carbon and subsequent dilution with n-hexane precipitated 10.0 g. of nearly white, crystalline product, M.P. 73–74° C.

Exampe 12

To a suspension of 2.1 g. (0.01 mole) of phosphorus pentachloride in 25 ml. of chloroform was added a solution of 2.4 g. (0.01 mole) of 4-hydroxy-2-butynyl N-(3-chlorophenyl)carbamate and 800 mg. (0.01 mole) of pyridine in 25 ml. of chloroform over a period of 30–40 minutes at about 0° C. The solution was then warmed to room temperature and kept at that temperature for about 3 hours. The chloroform solution was washed repeatedly with water, dried over anhydrous sodium sulfate and the solvent removed by distillation under reduced pressure. The residue was dissolved in about 20 ml. of hot benzene. Half of the benzene solution was placed on an alumina column. Elution with about 100 ml. of a benzene-ether (90:10 by volume) mixture and subsequent removal of the solvent from the eluate gave a residue which upon recrystallization gave 658 mg. (51%) of 4-chloro-2-butynyl N-(3-chlorophenyl)carbamate, M.P. 76–77° C.

Example 13

A large volume of a p-dioxane solution of 4-hydroxy-2-butynyl chlorocarbonate was prepared by the procedure of Example 2 using a 2-butyne-1,4-diol/phosgene mole ratio of 5/1.

Several 4-hydroxy-2-butynyl N-substituted carbamates were prepared by adding a mixture of pyridine and the appropriate amine (2:1 mole ratio pyridine:amine) to about an equimolar amount of the chlorocarbonate in dioxane. In the case of the liquid amines (ethylamine, diethylamine and piperidine) a 1.4 molar excess of the amine was used instead of pyridine to neutralize the hydrogen chloride as it was formed. The amine-pyridine solution was added dropwise to the stirred dioxane solution of the chlorocarbonate at 15–20° C. Stirring was continued for about 1 hour at ambient temperature and the mixture then poured into about 1500 ml. of ice-water. The crystalline product precipitated and was removed by filtration and air-dried. The crude carbamate was recrystallized from water and in some cases also from an organic solvent. Where the carbamate was an oil, the dioxane was removed by distillation under reduced pressure (water aspirator), the residue extracted with benzene or ether, the extract dried over calcium chloride and then distilled under reduced pressure.

The results are recorded in Table I.

TABLE I.—PREPARATION OF 4-HYDROXY-2-BUTYNYL CARBAMATES $$[HO-CH_2-C{\equiv}C-CH_2-O\overset{O}{\underset{\|}{C}}-\overset{R_1}{\underset{|}{N}}-R_2]$$

| $R_1$ | $R_2$ | M.P., °C. | Recrystallization Solvent |
|---|---|---|---|
| Phenyl | H | 68–69 | $H_2O$. Dioxane-hexane. |
| 3-bromophenyl | H | 102–103 | $H_2O$. |
| 4-nitrophenyl | H | 152–153 | $H_2O$. |
| 2-methoxyphenyl | H | 60–61 | $H_2O$. |
| 4-cyanophenyl | H | 167–168.5 | $H_2O$. Dioxane-hexane. |
| Ethyl | Ethyl | B.P. 150–155° C./1 mm | |
| Ethyl | H | B.P. 147–151° C./1.4 mm | |
| Piperidine* | | B.P. 95–100° C./0.9 mm | |

*The $-\overset{R_1}{\underset{|}{N}}-R_2$ radical is piperidine.

The following examples, Examples 14 and 15, are presented to give continuity to Serial No. 770,266, filed October 29, 1958, in regard to the novel compounds.

Example 14

A solution of 15.3 g. (0.1 mole) of 3-chlorophenyl isocyanate in 50 ml. of acetone was added dropwise with stirring to an acetone solution (300 ml.) of 43.0 g. (0.5 mole) of 2-butyne-1,4-diol at ambient temperature. The resulting solution was stirred and refluxed for 1 hour. The solution was cooled and then diluted with 750 ml. of water, boiled to expel the bulk of the actone, filtered hot and the filtrate chilled. The crystalline precipitate was removed by filtration to give 15.0 g. of cream-colored crystalline 4-hydroxy-2-butynyl N-(3-chlorophenyl)carbamate, M.P. 78–82° C. This represents a 65% yield based on 3-chlorophenyl isocyanate. The water-insoluble material (5.1 g.) which had been filtered from the hot aqueous solution melted at 120–125° C. and was assumed to be the crude bis-carbamate. Evaporation of the filtrate to dryness gave 34.4 g. (96% recovery) of the unreacted butyne diol.

After recrystallization from water the purified 4-hydroxy-2-butynyl N-(3-chlorophenyl)carbamate melted at 86.5–87° C.

Example 15

4-hydroxy-2-butynyl N-(3 - bromophenyl)carbamate was prepared by the procedure of Example 14 in which 1 mole of 2-butyne-1,4-diol was reacted with 0.1 mole of 3-bromophenyl isocyanate. The crystalline product melts at 102.5–103° C.

Example 16

The following compounds have also been prepared:
(1) 4-hydroxy-2-butynyl N-(2,4 - dichlorophenyl)carbamate; M.P. 128–130° C.
(2) 4-hydroxy-2-butynyl N-(3-nitrophenyl)carbamate; M.P. 133–134° C.
(3) 4-hydroxy-2-butynyl N - (3 - methoxyphenyl)carbamate; M.P. 119–120° C.

Various changes and modifications of the invention can be made and, to the extent that such variations incorporate the spirit of this invention, they are intended to be included within the scope of the appended claim.

What is claimed is:
4-hydroxy-2-butynyl N-(3-chlorophenyl)carbamate.

References Cited by the Examiner

UNITED STATES PATENTS

| | | | |
|---|---|---|---|
| 1,964,654 | 6/1934 | Ulrich et al. | 260—471 |
| 2,396,513 | 3/1946 | Jones | 260—473 |
| 2,724,720 | 11/1955 | Berger et al. | 260—482 |
| 2,788,268 | 4/1957 | Tursich et al. | 260—471 |
| 2,789,129 | 4/1957 | Bissinger | 260—471 |
| 2,816,910 | 12/1957 | Junkmann et al. | 260—471 |
| 2,873,291 | 2/1959 | Spiegler | 260—463 |
| 2,906,614 | 9/1959 | Hopkins et al. | 260—471 |
| 2,923,732 | 2/1960 | Norton | 260—463 |

OTHER REFERENCES

Bailey et al., J. Am. Chem. Soc., volume 77, pages 165–6 (1955).

Wagner et al., Synthetic Organic Chemistry (New York, 1953), pages 483–4 and 646–7.

LEON ZITVER, *Primary Examiner.*

DUVAL T. McCUTCHEN, *Examiner.*